United States Patent

Miller

(10) Patent No.: US 8,869,836 B2
(45) Date of Patent: Oct. 28, 2014

(54) HYDRAULIC DAMPING APPARATUS

(75) Inventor: David Miller, Nottingham (GB)

(73) Assignee: Rolls-Royce PLC, London (GB)

( * ) Notice: Subject to any disclaimer, the term of this patent is extended or adjusted under 35 U.S.C. 154(b) by 413 days.

(21) Appl. No.: 13/466,500

(22) Filed: May 8, 2012

(65) Prior Publication Data

US 2012/0298240 A1    Nov. 29, 2012

(30) Foreign Application Priority Data

May 27, 2011    (GB) .................................. 1108917.4

(51) Int. Cl.
*F02M 37/00*    (2006.01)
*B64D 37/10*    (2006.01)
*B64D 37/00*    (2006.01)

(52) U.S. Cl.
CPC ........... *F02M 37/0041* (2013.01); *B64D 37/10* (2013.01); *B64D 37/005* (2013.01)
USPC ................. 137/826; 137/13; 138/31

(58) Field of Classification Search
CPC .... F02M 37/0041; B64D 37/005; F16L 55/04
USPC ........................ 138/26, 30, 31; 137/13, 826; 123/184.57
See application file for complete search history.

(56) References Cited

U.S. PATENT DOCUMENTS

| 2,936,041 | A | * | 5/1960 | Sharp et al. ...................... 138/26 |
| 4,546,733 | A | * | 10/1985 | Fukami et al. ............ 123/184.57 |
| 4,750,523 | A | * | 6/1988 | Crouse ............................ 138/30 |
| 5,732,740 | A | * | 3/1998 | Hornyack et al. ................ 138/30 |
| 5,797,430 | A | | 8/1998 | Becké et al. |
| 6,536,457 | B2 | * | 3/2003 | Dooley ............................ 137/13 |
| 6,792,907 | B1 | | 9/2004 | Kostun et al. |
| 7,055,484 | B2 | | 6/2006 | Marks et al. |
| 7,306,006 | B1 | | 12/2007 | Cornell |
| 7,320,222 | B2 | * | 1/2008 | Flohr et al. ....................... 60/725 |
| 8,661,822 | B2 | * | 3/2014 | Slobodyanskiy et al. ...... 60/725 |
| 2002/0000343 | A1 | * | 1/2002 | Paschereit et al. ............ 181/229 |
| 2006/0150723 | A1 | | 7/2006 | Delp et al. |
| 2009/0063016 | A1 | | 3/2009 | Nakata et al. |

FOREIGN PATENT DOCUMENTS

| DE | 10 2005 052 881 A1 | 5/2007 |
| EP | 1 342 911 A2 | 9/2003 |
| EP | 2 116 752 A1 | 11/2009 |

OTHER PUBLICATIONS

Sep. 23, 2011 British Search Report issued in British Patent Application No. GB1108917.4.

* cited by examiner

*Primary Examiner* — Eric Keasel
(74) *Attorney, Agent, or Firm* — Oliff PLC

(57) ABSTRACT

A hydraulic damping apparatus comprising a conduit for a hydraulic fluid having a port in a wall of the conduit; a resonator having a chamber and a neck, the neck being arranged to provide fluid communication between the chamber and the port. The apparatus further comprises a first pressure sensor arranged to sense pressure in the conduit upstream of the port, a second pressure sensor arranged to sense pressure in the conduit downstream of the port, and a controller configured to determine the amplitude of a pressure fluctuation sensed by the first pressure sensor and the amplitude of a pressure fluctuation sensed by the second pressure sensor. The controller is further configured to vary a resonant frequency of the resonator in accordance with a difference between the amplitude of the pressure fluctuation sensed by the first pressure sensor and the amplitude of the pressure fluctuation sensed by the second pressure sensor.

15 Claims, 1 Drawing Sheet

HYDRAULIC DAMPING APPARATUS

This invention relates to a hydraulic damping apparatus and particularly, although not exclusively, concerns a hydraulic damping apparatus for an aircraft fuel system.

It is known to use hydraulic dampers, known as ripple dampers, in aircraft fuel systems to damp pressure fluctuations in the fuel system caused by operation of fuel pumps.

For example, a resonator such as a Helmholtz resonator can be disposed downstream of a fuel pump to damp fluctuations caused by operation of the upstream pump.

A Helmholtz resonator comprises a chamber and a neck. The chamber is provided in fluid communication with a conduit of the fuel system via the neck. The neck is generally perpendicular to the flow through the conduit. Fluctuations in pressure within the conduit cause a plug of fluid within the neck to oscillate within the neck. The plug of fluid within the neck acts on the larger body of fluid within the chamber. The larger body of fluid within the chamber functions as a spring which oscillates out of phase with the fluctuations within the conduit. Thus, the resonator actively damps the pressure fluctuations within the conduit.

A Helmholtz resonator has a resonant frequency which is dependent on the size of the chamber. A Helmholtz resonator is therefore only effective over a relatively narrow frequency range, for example 50 Hz. In an aircraft fuel system, the chamber is sized in accordance with an operating frequency of the pump at which damping is considered to be most essential. However, during normal operation, the speed of a fuel pump varies with the speed of the engine. This causes variation in the frequency of the pressure fluctuations downstream of the pump. The pump is therefore operated over a frequency range which is often much greater than the effective damping range of the Helmholtz resonator. The range may typically be 300 Hz. Consequently, over much of the operating range of the pump, the pump frequency will be outside the effective damping range of the Helmholtz resonator. Undamped fluctuations within the fuel system can damage the fuel system, for example by bursting fuel hoses, and can contribute to an increase in noise, which is undesirable.

Furthermore, when a high demand is placed on a pump (i.e. the pump is operated at high speed), cavitation can occur which causes forcing at multiple frequencies that cannot be damped effectively by the Helmholtz resonator.

According to a first aspect of the present invention there is provided a hydraulic damping apparatus comprising: a conduit for a hydraulic fluid having a port in a wall of the conduit; a resonator having a chamber and a neck, the neck being arranged to provide fluid communication between the chamber and the port; a first pressure sensor arranged to sense pressure in the conduit upstream of the port; a second pressure sensor arranged to sense pressure in the conduit downstream of the port; and a controller configured to determine the amplitude of a pressure fluctuation sensed by the first pressure sensor and the amplitude of a pressure fluctuation sensed by the second pressure sensor, the controller being further configured to vary a resonant frequency of the resonator in accordance with a difference between the amplitude of the pressure fluctuation sensed by the first pressure sensor and the amplitude of the pressure fluctuation sensed by the second pressure sensor.

The controller may be configured to determine component frequencies of the pressure fluctuations sensed by the first pressure sensor and the second pressure sensor. The controller may be further configured to determine one of the component frequencies as a target frequency.

The controller may be configured to determine a difference between an amplitude of the pressure fluctuation sensed by the first pressure sensor and an amplitude of the pressure fluctuation sensed by the second pressure sensor at each component frequency, and to determine the component frequency having the smallest difference as the target frequency. The difference at each component frequency may be a weighted difference.

The controller may be configured to match the resonant frequency of the resonator with the target frequency.

The volume of the chamber may be varied to vary the resonant frequency of the resonator.

The damping apparatus may comprise a plurality of resonators, each resonator having a chamber and a neck, each neck being arranged to provide fluid communication between the chamber of the respective resonator and a respective port in a wall the conduit, wherein the resonant frequency of each resonator is variable independently of the other resonators.

According to a second aspect of the invention there is provided a method of damping a hydraulic fluid using a hydraulic damping apparatus in accordance with the first aspect of the invention, the method comprising the steps: (a) determining the amplitude of a pressure fluctuation in the conduit upstream of the port; (b) determining the amplitude of a pressure fluctuation in the conduit downstream of the port; (c) determining a difference between the amplitudes of the upstream pressure fluctuation and the downstream pressure fluctuation; and (d) varying the resonant frequency of the resonator in accordance with a difference between the amplitude of the upstream pressure fluctuation and the amplitude of the downstream pressure fluctuation.

Step (a) may comprise the step of determining component frequencies of the pressure fluctuation sensed upstream of the port. Step (b) may comprise the step of determining component frequencies of the pressure fluctuation sensed downstream of the port.

Step (c) may comprise the step of determining one of the component frequencies as a target frequency.

Step (c) may comprise the step of determining a difference between an amplitude of the pressure fluctuation sensed upstream of the port and an amplitude of the pressure fluctuation sensed downstream of the port at each component frequency, and determining the component frequency having the smallest difference as the target frequency. The difference at each component frequency may be a weighted difference.

Step (d) may comprise the step of matching the resonant frequency of the resonator with the target frequency. The volume of the chamber may be varied to vary the resonant frequency of the resonator.

For a better understanding of the present invention, and to show more clearly how it may be carried into effect, reference will now be made, by way of example, to the accompanying drawings, in which:—

Figure 1:
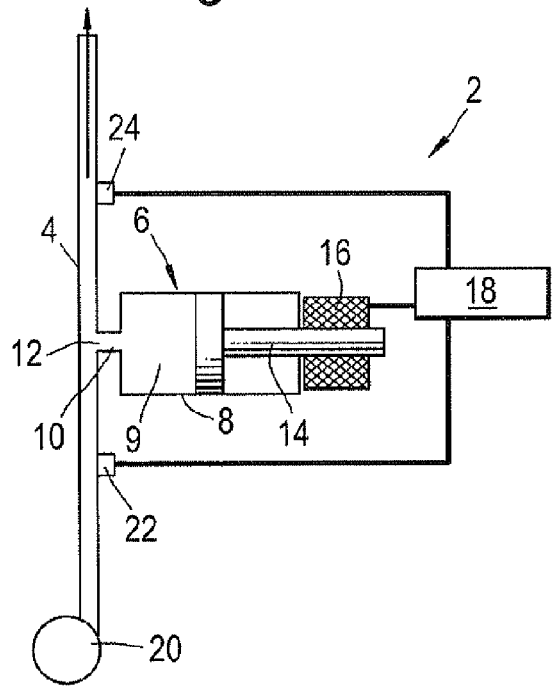
FIG. 1 shows a first embodiment of a hydraulic damping apparatus.

FIG. 1 shows a hydraulic damping arrangement 2 comprising a conduit 4 for a hydraulic fluid such as fuel. A resonator 6, which in the embodiment shown is a Helmholtz resonator, is disposed adjacent the conduit 4. The resonator 6 comprises a cylindrical cavity 8 and a neck 10. The neck 10 extends from one end of the cavity 8 to a port 12 in a sidewall of the conduit 4 and extends substantially perpendicularly to the conduit 4. The neck 10 provides fluid communication between the cavity 8 and the conduit 4.

A piston 14 is disposed within the cavity 8. The piston 14 seals against an inner wall of the cavity 8 to define a chamber 9 between the piston 14 and the neck 10. The piston 14 is displaceable within the cavity 8 in the lengthwise direction of the cavity 8 to vary the volume of the chamber 9.

The piston 14 is actuable by an actuator 16, which is disposed externally at one end of the cavity 8. The actuator 16 is connected to a controller 18 which is configured to control the actuator 16 in order to vary the position of the piston 14 within the cavity 8. The controller 18 may comprise a processor which is integrated with the apparatus 2.

The conduit 4 is connected to a pump 20 for pumping a hydraulic fluid, such as fuel, through the conduit 4. The pump 20 may be a rotary pump. The pump 20 is configured to pump fluid from the pump 20 along the conduit 4 and past the port 12 in the sidewall of the conduit 4. The normal direction of flow along the conduit 4 is depicted by the arrow along the conduit 4 shown in FIG. 1.

A first pressure sensor 22 is disposed at the conduit 4 between the pump 20 and the port 12. The first pressure sensor 22 is disposed upstream of the port 12. A second pressure sensor 24 is disposed at the conduit 4 downstream of the port 12. The pressure sensors 22, 24 may be disposed at equal distances or at different distances from the port 12. The pressure sensors 22, 24 may be of the type sold under the trademark KULITE®. The pressure sensors 22, 24 are connected to the controller 18.

The pressure sensors 22, 24 may, for example, be total pressure or static pressure sensors. The pressure sensors 22, 24 may be configured to detect a pressure difference between the pressure sensors 22, 24.

In use, a hydraulic fluid is pumped by the pump 20 along the conduit 4. The chamber 9 is completely flooded with the hydraulic fluid. The chamber 9 may be flooded prior to use, or by the initial flow of hydraulic fluid through the conduit 4.

The hydraulic fluid is pumped along the conduit 4 past the first pressure sensor 22, the port 12 and the second pressure 24. It will be appreciated that at least some exchange of hydraulic fluid between the conduit 4 and the chamber 9 may occur. However, this is expected to be minimal.

Operation of the pump 20 will typically produce a periodic pressure fluctuation in the hydraulic fluid which varies in accordance with the operating speed of the pump 20. The pressure fluctuation propagates from the pump 20 downstream along the conduit 4 as a pressure wave. As the pressure wave passes the port 12, it causes a mass of fluid within the neck 10 (generally referred to as a "plug") to oscillate. The oscillating mass of fluid within the neck 10 acts on the larger body of fluid within the chamber 9. The larger body of fluid within the chamber 9 acts as a spring which oscillates out of phase with the fluctuations within the conduit 4. Therefore, the resonator 6 actively damps the pressure fluctuations within the conduit 4.

The closer the frequency of the fluctuation to the resonant frequency of the resonator 6, the more energy is transferred from the hydraulic fluid in the conduit 4 to the hydraulic fluid in the chamber 9. Consequently, the closer the frequency of the fluctuation to the resonant frequency of the resonator 6 the greater the damping of the fluctuation as it passes across the port 12.

It will be appreciated that the pressure fluctuation may comprise multiple component frequencies.

Operation of the hydraulic damping arrangement 2 is as follows.

The first and second pressure sensors 22, 24 sense the pressure of the hydraulic fluid in the conduit upstream and downstream of the port 12 respectively. First and second signals representing the sensed pressure at each pressure sensor 22, 24 are fed from the respective pressure sensors to the controller 18.

The first and second signals are processed by the controller 18 to determine the component frequencies of each signal. The component frequencies may be identified, for example, using known techniques such as performing a Fourier transform on each signal.

The amplitude of the pressure fluctuation at each component frequency is then determined by the controller 18. A difference between the amplitude of the first signal and the amplitude of the second signal is then determined at each component frequency. A weighting is then applied to each difference. For example, a greater weighting may be applied to a difference at a frequency which is known to be more damaging or problematic than other frequencies. Furthermore, a weighting may be based on the amplitude of the fluctuation at the component frequency at the first and/or second sensor. For example, a weighting may be greater for a component frequency having a larger amplitude fluctuation at the first sensor than the other component frequencies.

Based on the weighted differences, the controller 18 selects a target frequency which is to be damped. The target frequency can be selected on the basis of the component frequency which has been damped least effectively by the resonator 6, in accordance with the weightings applied to the component frequencies. The target frequency may, for example, be selected as the component frequency having the smallest weighted difference.

The position of the piston 14 within the cavity 8 is then adjusted to increase or decrease the volume of the region of the chamber 9 so as to match the frequency of the resonator 6 with the target frequency. Moving the piston 14 towards the neck 10, thereby reducing the volume of the region of the chamber 9 between the piston 14 and the neck 10, increases the resonant frequency of the resonator 6. Conversely, moving the piston 14 away from the neck 10, thereby increasing the volume of the region of the chamber 9 between the piston 14 and the neck 10, decreases the resonant frequency of the resonator 6. The resonant frequency of the resonator 6 can therefore be tuned to match the target frequency.

The resonant frequency of the resonator 6 may, for example, be determined by a pressure sensor (not shown) in the chamber 9 or by look-up tables which associate the position of the piston 14 with a frequency of the resonator 6.

Once the resonant frequency of the resonator 6 has been matched against the target frequency, the resonator 6 is excited at its resonant frequency by the pressure fluctuation in the conduit 4. The resonator 6 dissipates energy from the hydraulic fluid in the conduit 4 thereby damping the pressure fluctuation at the target frequency. The amplitude of the fluctuation at the target frequency is therefore reduced downstream of the port 12.

Figure 2:
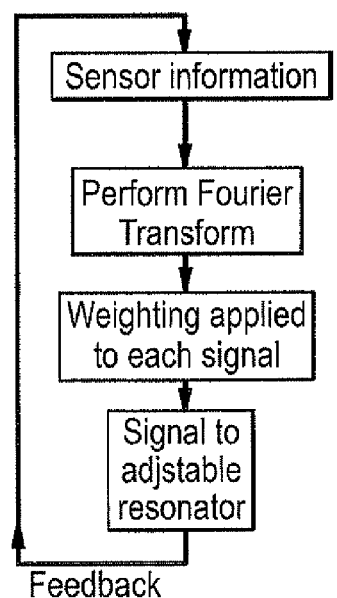
FIG. 2 shows a flow chart for a method of damping a hydraulic fluid using the apparatus shown in FIG. 1.

The process of identifying a target frequency and matching the resonant frequency of the resonator with the target frequency as described above is accomplished using a feedback process loop, such as that represented by the flow chart shown in FIG. 2. The volume of the chamber 9 can therefore be continually adjusted to maximise the weighted difference between the amplitudes of the fluctuation at each sensor 22, 24 (i.e. maximise damping) at the target frequency.

It will appreciated that damping of the fluctuation at the target frequency can result in a change in the target frequency which could lead to unstable switching between different target frequencies. Appropriate control algorithms may therefore be used to ensure that changes in the resonant frequency of the resonator 6 do not lead to unstable switching between different component frequencies as target frequencies.

The pump 20 may, for example, operate at a particular speed which forces the hydraulic fluid at three component frequencies X, Y and Z having the same amplitude. The resonant frequency of the resonator 6 does not match any of the component frequencies and so there is no, or negligible, damping of the fluctuation at any of the component frequencies X, Y and Z. Consequently, the differences in the amplitudes at each frequency between the first pressure sensor 22 and the second pressure sensor 24 are equal. It is known, for example, that of the three component frequencies X, Y and Z, pressure fluctuations at Y are the most detrimental to the performance of the fuel system 2. A weighting is therefore applied to frequency Y such that frequency Y is selected as the target frequency. The position of the piston 14 is then adjusted to match the resonant frequency of the resonator 6 with the target frequency. The resonator 6 is therefore tuned to the target frequency and so damps the fluctuation at the target frequency Y.

It will be appreciated that the differences between the amplitudes of the component frequencies are unlikely to be equal. In some circumstances, the weightings may be such that a component frequency selected as the target frequency may have a difference between the amplitude of the pressure fluctuation at the first pressure sensor 22 and the second pressure sensor 24 before the weightings are applied which is larger than the differences between the amplitudes at other component frequencies.

The sensors 22, 24 may each be disposed at any distance from the port 12. However, it is expected that the closer the pressure sensors 22, 24 are to the port 12, the better the accuracy of the apparatus. Other devices for determining a difference between the amplitude of the pressure fluctuation downstream of the port 12 and the pressure fluctuation upstream of the port 12 may be used.

The target frequency may be a range of frequencies over which the resonator 6 can provide effective damping.

Figure 3:
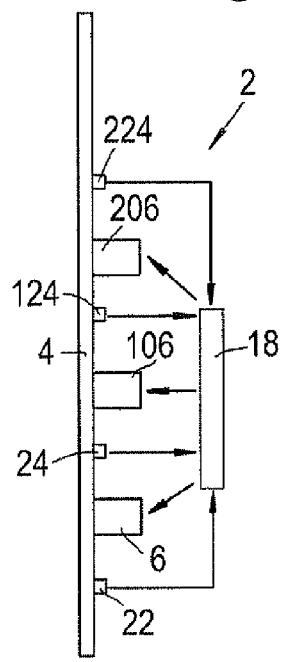
FIG. 3 shows a second embodiment of a hydraulic damping apparatus.

FIG. 3 shows a second embodiment of a hydraulic damping apparatus 2 in which three resonators 6, 106, 206, which are the same as the resonator shown in FIG. 1, are disposed successively along the length of a conduit 4. Pressure sensors 22, 24, 124, 224 are disposed upstream and downstream of the respective resonators 6, 106, 206 and connected to a controller 18. Two of the pressure sensors 24, 124 are disposed between adjacent resonators 6, 106, 206 to provide respective upstream or downstream pressure measurements for the respective resonators 6, 106, 206 on each side of them. The resonant frequency of each of the resonators 6, 106, 206 can be varied by a controller 18 independently of the other resonators 6, 106, 206. Consequently, the arrangement forms a single damping zone which can be used to damp multiple frequencies of a pressure fluctuation in the conduit 4. The number of resonators can be increased or decreased to provided for damping for a corresponding number of component frequencies or range of frequencies.

It will be appreciated that the hydraulic damping apparatus described above would be suitable for use with types of hydraulic fluid other than fuel.

In a specific embodiment, damping apparatus as described above may be provided in a fuel supply conduit 4 of a gas turbine for delivering fuel to fuel injectors of the engine. The pump 20 then comprises a fuel pump of the engine. The damping apparatus may serve to damp pressure fluctuations in the conduit induced, for example, by operation of the pump 20 and by combustion effects introduced at the fuel injection.

The invention claimed is:

1. A hydraulic damping apparatus comprising:
   a conduit for a hydraulic fluid having a port in a wall of the conduit;
   a resonator having a chamber and a neck, the neck being arranged to provide fluid communication between the chamber and the port;
   a first pressure sensor arranged to sense pressure in the conduit upstream of the port;
   a second pressure sensor arranged to sense pressure in the conduit downstream of the port; and
   a controller configured to determine the amplitude of a pressure fluctuation sensed by the first pressure sensor and the amplitude of a pressure fluctuation sensed by the second pressure sensor, the controller being further configured to vary a resonant frequency of the resonator in accordance with a difference between the amplitude of the pressure fluctuation sensed by the first pressure sensor and the amplitude of the pressure fluctuation sensed by the second pressure sensor.

2. A hydraulic damping apparatus as claimed in claim 1, wherein the controller is configured to determine component frequencies of the pressure fluctuations sensed by the first pressure sensor and the second pressure sensor.

3. A hydraulic damping apparatus as claimed in claim 2, wherein the controller is configured to determine one of the component frequencies as a target frequency.

4. A hydraulic damping apparatus as claimed in claim 3, wherein the controller is configured to determine a difference between an amplitude of the pressure fluctuation sensed by the first pressure sensor and an amplitude of the pressure fluctuation sensed by the second pressure sensor at each component frequency, and to determine the component frequency having the smallest difference as the target frequency.

5. A hydraulic damping apparatus as claimed in claim 4, wherein the difference at each component frequency is a weighted difference.

6. A hydraulic damping apparatus as claimed in claim 3, wherein the controller is configured to match the resonant frequency of the resonator with the target frequency.

7. A hydraulic damping apparatus as claimed in claim 1, wherein the volume of the chamber is varied to vary the resonant frequency of the resonator.

8. A hydraulic damping apparatus as claimed in claim 1, wherein the damping apparatus comprises a plurality of resonators, each resonator having a chamber and a neck, each neck being arranged to provide fluid communication between the chamber of the respective resonator and a respective port in a wall the conduit, wherein the resonant frequency of each resonator is variable independently of the other resonators.

9. A method of damping a hydraulic fluid using a hydraulic damping apparatus as claimed in any one of the preceding claims, the method comprising the steps:
   (a) determining the amplitude of a pressure fluctuation in the conduit upstream of the port;
   (b) determining the amplitude of a pressure fluctuation in the conduit downstream of the port;
   (c) determining a difference between the amplitudes of the upstream pressure fluctuation and the downstream pressure fluctuation; and
   (d) varying the resonant frequency of the resonator in accordance with a difference between the amplitude of the upstream pressure fluctuation and the amplitude of the downstream pressure fluctuation.

10. A method as claimed in claim 9, wherein step (a) comprises the step of determining component frequencies of the pressure fluctuation sensed upstream of the port and step (b) comprises the step of determining component frequencies of the pressure fluctuation sensed downstream of the port.

11. A method as claimed in claim 10, wherein step (c) comprises the step of determining one of the component frequencies as a target frequency.

12. A method as claimed in claim 11, wherein step (c) comprises the step of determining a difference between an amplitude of the pressure fluctuation sensed upstream of the port and an amplitude of the pressure fluctuation sensed downstream of the port at each component frequency, and determining the component frequency having the smallest difference as the target frequency.

13. A method as claimed in claim 12, wherein the difference at each component frequency is a weighted difference.

14. A method as claimed in claim 11, wherein step (d) comprises the step of matching the resonant frequency of the resonator with the target frequency.

15. A method as claimed in claim 9, wherein the volume of the chamber is varied to vary the resonant frequency of the resonator.

\* \* \* \* \*